United States Patent [19]

McDaniel et al.

[11] Patent Number: 5,208,309

[45] Date of Patent: May 4, 1993

[54] LINEAR, VERY LOW DENSITY POLYETHYLENE POLYMERIZATION PROCESS AND PRODUCTS THEREOF

[75] Inventors: Max P. McDaniel; Elizabeth A. Benham, both of Bartlesville, Okla.

[73] Assignee: Phillips Petroleum Company, Bartlesville, Okla.

[21] Appl. No.: 829,807

[22] Filed: Jan. 31, 1992

[51] Int. Cl.$^5$ ............... C08F 210/02; C08F 210/08; C08F 210/14

[52] U.S. Cl. .................. 526/348.2; 526/348.5; 526/348.6; 526/106

[58] Field of Search ............... 526/106, 348.2, 348.5, 526/348.6

[56] References Cited

U.S. PATENT DOCUMENTS

| | | | |
|---|---|---|---|
| 4,424,320 | 1/1984 | McDaniel | 526/106 |
| 4,503,201 | 3/1985 | McDaniel et al. | 526/106 |
| 4,619,980 | 10/1986 | McDaniel et al. | 526/96 |
| 4,672,096 | 6/1987 | Nowlin | 526/116 |
| 4,966,951 | 10/1990 | Benham et al. | 526/106 |
| 5,071,927 | 12/1991 | Benham et al. | 526/106 |

Primary Examiner—Joseph L. Schofer
Assistant Examiner—David Wu
Attorney, Agent, or Firm—Lynda S. Jolly

[57] ABSTRACT

A copolymer of ethylene and a higher alpha-olefin, preferably 1-butane and/or 1-hexane, can be produced using an activated and subsequently carbon monoxide reduced chromium containing catalyst system and an alkylaluminum or alkylboron cocatalyst. The polymerization process must be carefully controlled to produce a copolymer resin that can be made into a tough product, with an increased melt index and a broad molecular weight distribution.

16 Claims, No Drawings

LINEAR, VERY LOW DENSITY POLYETHYLENE POLYMERIZATION PROCESS AND PRODUCTS THEREOF

BACKGROUND

This invention relates to the copolymerization of a mono-1-olefin monomer, such as ethylene, with a higher alpha-olefin comonomer.

It is well known that mono-1-olefins such as ethylene can be polymerized with catalyst systems employing vanadium, chromium or other metals on a support such as alumina, silica, aluminum phosphate, titania, zirconia, magnesia and other refractory materials. Initially such catalysts were used primarily to form homopolymers of ethylene. It soon developed, however, that many applications required polymers which were more impact resistant than ethylene homopolymers. Consequently, in order to produce polymer having short chain branching like the more flexible free radical polymerized ethylene polymers, comonomers such as propylene, butene, hexene or other higher olefins were copolymerized with the ethylene to provide resins tailored to specific end uses.

Unfortunately, these comonomers do not efficiently incorporate into the polymer and, therefore, excessive amounts of expensive comonomer must be used. Furthermore, the resultant copolymers are not always linear, low-density copolymers and, thus, are physically weak copolymers, having low impact resistance, especially when made into films. In addition, polymerization operating parameters can create conditions in which the copolymer swells during polymerization and interferes with the polymerization and copolymer recovery processes.

SUMMARY OF THE INVENTION

It is an object of this invention to provide an improved polymerization process.

It is another object of this invention to provide copolymers of ethylene and higher alpha-olefins having a toughness imparted by short chain branching.

It is yet another object of this invention to provide copolymers of ethylene and higher alpha-olefins that can be easily processed into a tough, impact resistant film.

In accordance with this invention, a slurry polymerization process comprising contacting in a reaction zone under polymerization conditions, at a temperature in a range of about 60° to about 77° C.; a paraffin, cycloparaffin, or aromatic hydrocarbon diluent; ethylene monomer; a comonomer selected from the group consisting of 1-butene, 1-pentene, 1hexene, 1-octene and/or 4-methyl-1-pentene, in amount in a range of about 15 to about 60 weight percent, based on the amount of total alpha-olefin reactor feed; an alkylaluminum and/or alkylboron compound in an amount within a range of about 2 to about 20 milligrams per kilogram (mg/kg), based on the mass of diluent; and a catalyst system comprising chromium supported on a silica-titania support, wherein said support comprises from about 2 to about 20 weight percent titanium, based on the weight of the support, and wherein said catalyst system has been activated in an oxygen-containing ambient and subsequently reduced in the presence of carbon monoxide is provided.

In accordance with another embodiment of this invention, a copolymer product of ethylene and at least one higher alpha-olefin which can be characterized as linear, very low-density polyethylene (VLDPE) and has improved toughness and impact resistance, is provided.

DESCRIPTION OF THE PREFERRED EMBODIMENTS

As used in this disclosure, the terms "polymer" and "copolymer" are used interchangeably. Both terms include the product of polymerizing a monomer, ethylene, and a comonomer, selected from the group consisting of 1-butene, 1-pentene, 1-hexene, 1-octene, and/or 4-methyl-1-pentene.

Catalyst Systems

The catalyst support must be a silica-titania support. As used in this application, the reference to silica means a silica-containing material generally composed of 80 to 100 weight percent silica, the remainder, if any, being selected from alumina, boria, magnesia, thoria, zirconia, or mixtures thereof. For instance, the silica-containing material can consist essentially of silica and no more than 0.2 weight percent of alumina or other metal oxide. Other ingredients which do not adversely affect the catalyst, or which are present to produce some unrelated result, can also be present. Preferably, the support contains from about 2 to about 20 weight percent titanium (Ti), based on the total weight of the dry support. Most preferably, the support contains 5 to 8 weight percent titanium, in order to produce a polymer with the most desirable characteristics.

Silica-titania supports are well known in the art and can be produced as disclosed in Dietz, U.S. Pat. No. 3,887,494, the disclosure of which is hereby incorporated by reference.

The catalyst component must be a chromium compound. The chromium component can be combined with the silica-titania support component in any manner known in the art, such as for example, forming a coprecipitated tergel of the silica, titanium, and chromium components. Alternatively, an aqueous solution of a water soluble chromium component can be added to a hydrogel of the silica-titanium component. Suitable water soluble chromium compounds include, but are not limited to, chromium nitrate, chromium acetate, and chromium trioxide. Alternatively, a solution of a hydrocarbon soluble chromium component such as tertiary butyl chromate, a diarene chromium compound, biscyclopentadientyl chromium(II) or chromium acetyl acetonate can be used to impregnate the silica-titania xerogel which results from removal of water from the cogel.

The chromium component is used in an amount sufficient to give from about 0.05 to about 5, preferably 0.5 to 2, weight percent chromium, based on the total weight of the chromium and support after activation.

The resulting chromium component on the silica-titania support is then subjected to activation in an oxygen-containing ambient in the manner conventionally used in the art. Because of economy, the preferred oxygen-containing ambient is air, preferably dry air. The activation is carried out at an elevated temperature for about one-half to about 50 hours, preferably about 2 to about 10 hours, at a temperature within the range of about 300° to about 1000° C., preferably 300° to 800° C. Under these conditions, at least a substantial portion of any chromium in a lower valent state is converted to the hexavalent state by this calcination procedure.

The resulting calcined, supported catalyst component is cooled and then subjected to at least partial reduction of the hexavalent chromium to a lower valent state prior to combining with the cocatalyst. The reducing agent must be carbon monoxide in order to effectively incorporate a comonomer into the copolymer. If a reducing agent other than carbon monoxide is used, higher amounts of comonomer are needed in the reaction zone to achieve similar amounts of comonomer incorporation into the resultant copolymer. Generally, the calcined catalyst is directly subjected to the reducing agent, although intervening steps may be employed, if desired.

The cabon monoxide can be employed at temperatures between about 300° to about 500° C. although it is preferably employed at temperatures in the range of 350° to 450° C. for best chromium reduction. The partial pressure of the reducing gas in the reduction operation can be varied from sub-atmospheric pressures to relatively high pressures, but the simplest reducing operation is to utilize essentially pure carbon monoxide at about atmospheric pressure.

The reduction time can vary from a few minutes to several hours or more. The extent of reduction can be followed by visual inspection of catalyst color. The color of the initial activated catalyst is generally orange, indicating the presence of hexavalent chromium. The color of the reduced catalyst system employed in the invention is blue, indicating that all or substantially all of the initial hexavalent chromium has been reduced to lower oxidation states, generally the divalent state.

The course of the reduction of the air-activated orange catalyst with carbon monoxide can be determined exactly by pulse titration. A known amount of carbon monoxide is added per pulse and the amount of evolved carbon dioxide is measured. When reduction is complete only carbon monoxide will be present and the catalyst system is blue in color. The reduced blue catalyst system can be titrated with pulses of oxygen to convert the catalyst system to the original orange color. When oxidation is complete, oxygen will be evident in the off gas.

After reduction, the reduced supported catalyst system is cooled to about room temperature, e.g. about 25° C., in an inert atmosphere such as argon or nitrogen to flush out the carbon monoxide. After this flushing treatment, the catalyst system is kept away from contact with either reducing or oxidizing agents, i.e., carbon monoxide and oxygen.

The catalyst systems of this invention must be used in conjunction with a cocatalyst. Suitable cocatalysts include aluminum alkyls and boron alkyls, which can increase the melt flow characteristics of the resultant alkyls, which can increase the melt flow characteristics of the resultant polymer. Suitable aluminum alkyls include $R_3Al$, and $RAlX_2$ compounds, wherein R is a hydrocarbyl radical having from about 1 to about 12 carbon atoms per radical and X is a halogen, preferably chlorine. Triethylaluminum and diethylaluminum chloride are particularly suitable.

Exemplary boron compounds include, but are not limited to, trialkyl boron compounds, particularly tri-n-butylborane, tripropylborane, and triethylborane (TEB). Other suitable boron compounds include trihydrocarbyl boron compounds broadly; triaryl boron compounds, such as, for example, triphenylborane; boron alkoxides, such as, for example, $B(C_2H_5)_2H_5$; and halogenated alkyl boron compounds, such as, for example, $BC_2H_5Cl_2$.

Preferably, the cocatalyst is a trialkyl boron compound, wherein the alkyl group has from about 1 to about 10 carbon atoms and preferably from 2 to 4 carbon atoms per alkyl group. Trialkyl boron compounds are preferred cocatalysts because these compounds are effective agents to improve polymer properties, such as, for example, to reduce melt flow and to retard polymer swelling during polymerization. By far, the most preferred cocatalyst is triethyl borane, for the reasons given above.

The cocatalyst is used in an amount within a range of about 1 to about 20 parts per million (ppm), or milligrams per kilograms (mg/kg), based on the mass of diluent in the reactor. Preferably, the cocatalyst is used in an amount within a range of 3 to 12 mg/kg, for cost effectiveness and best resultant polymer properties.

Reactants

The polymers produced according to the process of this invention must be copolymers. This invention process is of particular applicability in producing copolymers of ethylene and higher alpha-olefins. Ethylene monomer must be polymerized with a comonomer from the group consisting of 1-butene, 1-pentene, 1-hexene, 1-octene, 4-methyl-1-pentene, and mixture thereof. Ethylene is the most preferred monomer, due to the advantageous properties of the resultant copolymer. Preferably, the comonomer is 1-butene and/or 1-hexene, to achieve maximum polymer toughness.

The comonomer, including that which is recycled after recovery of the polymer, is added to the polymerization reactor, or reaction zone, in an amount within a range of about 30 to about 60 weight percent, based on the weight of the ethylene monomer. Preferably, when the comonomer is 1-butene, 1-butene is added to the reaction zone within a range of 25 to 35 weight percent of total ethylene feed in order to produce a polymer with the most desired properties, such as for example, improved toughness, increased melt index, and a broad molecular weight distribution. Preferably, if the comonomer is 1-hexene, 1-hexene is added to the reaction zone within a range of 35 to 45 weight percent, for the reasons stated above for 1-butene.

The amount of comonomer added to the polymerization reactor, or the reaction zone, also can be expressed in terms of comonomer/monomer molar ratios. When the comonomer is 1-butene and the monomer is ethylene, the mole ratio of 1-butene/ethylene in the reactor flash gas is generally within a range of about 0.70 to about 1.5, and preferably within a range of 0.9 to 1.2, for reasons given above. When the comonomer is 1-hexene and the monomer is ethylene, the mole ratio of 1-hexene/ethylene in the reactor flash gas generally is within a range of about 0.30 to about 0.50, and preferably within a range of 0.3 to 0.4, for reasons given above.

While not wishing to be bound by theory, it is believed that additional comonomers, as disclosed earlier, can be generated in-situ in the polymerization reactor, or the reaction zone, as disclosed in U.S. Pat. No. 4,820,785 (McDaniel et al, 1988), the entirety of which is herein incorporated by reference. However, the amount of comonomers generated in-situ is difficult to quantify. Since more than one comonomer is generated in-situ, the resultant copolymer product can have more than one comonomer incorporated into the copolymer.

Polymerization

Polymerization of the monomer and comonomer must be carried out under slurry, also known as particle form, polymerization conditions wherein the temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The temperature of the polymerization reactor, or reaction zone, according to this invention, is critical and must be kept within the range of about 60° to about 77° C., preferably within the range of about 60° to about 70° C. Most preferably, the reaction zone temperature is within the range of 63° to 68° C. Although higher reactor temperatures can be used, operating outside of the specified temperature ranges produces a copolymer which can be more subject to swelling during polymerization, can have a higher density, reduced toughness, a lower melt index, and/or a narrower molecular weight distribution.

The slurry process is generally carried out in an inert diluent (medium), such as, for example, a paraffin, cycloparaffin, and/or aromatic hydrocarbon. Exemplary diluents include, but are not limited to propane, n-butane, isobutane, n-pentane, 2-methylbutane (isopentane), and mixtures thereof. Isobutane or propane are the preferred diluents due to low cost and ease of use.

Pressures in the particle form process can vary from about 110 to about 700 psia (0.76–4.8 MPa) or higher. The catalyst system is kept in suspension and is contacted with the monomer and comonomer(s) at sufficient pressure to maintain the medium and at least a portion of the monomer and comonomer(s) in the liquid phase. The medium and temperature are thus selected such that the copolymer is produced as solid particles and is recovered in that form. Catalyst system concentrations can be such that the catalyst system content ranges from 0.001 to about 1 weight percent based on the weight of the reactor contents.

Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors a chromium catalyst system which has not been subjected to the reduction step can be utilized either before or after the reactor utilizing the catalyst system of this invention. In another specific instance, a conventional chromium oxide on a predominantly silica support can be utilized in a reactor in parallel with a reactor utilizing the catalyst system of this invention and the resulting polymerization influence combined prior to recovering the copolymer.

The molecular weight of the copolymer can be controlled by various means known in the art such as adjusting the temperature of the reaction zone (higher temperature giving lower molecular weight), introducing hydrogen to lower the molecular weight or varying the catalyst system compounds.

The catalyst system, cocatalyst, monomer, and comonomer can be added to the reaction zone in any order, according to any method known in the art. For example, the catalyst system, cocatalyst, monomer, and comonomer can be added simultaneously to the reaction zone. If desired, the catalyst system and cocatalyst can be precontacted in an inert ambient prior to contacting the monomer and/or comonomer. If the catalyst and cocatalyst are precontacted, as disclosed by McDaniel et al in U.S. Pat. No. 4,735,931, herein incorporated by reference, some comonomer can be generated in-situ; therefore, the amount of comonomer that is affirmatively added to the reaction zone can be reduced, but still remain within the ranges disclosed above.

Product

The polymers produced in accordance with this invention must be a copolymer of ethylene and at least one higher alpha-olefin. The comonomer, or higher alpha-olefin, in the polymerization reactor, whether affirmatively added or generated in-situ, is very efficiently incorporated into the copolymer. The copolymer product contains from about 12 to about 40 weight percent, preferably from about 14 to about 25 weight percent comonomer, based on the total weight of the copolymer product. Most preferably, the comonomer is present in the copolymer within the range of 15 to 20 weight percent for the best copolymer properties.

The copolymers produced according to this invention are impact resistant, tough, linear, very low-density polyethylene (VLDPE) copolymers, having a broad molecular weight distribution and an increased melt index. Usually, the melt index (MI) for polymers produced in accordance with this invention are within a range of about 0.05 to about 0.35 g/10 min, preferably within a range of about 0.05 to about 0.3 g/10 min. Most preferably, the inventive polymers have a MI within a range of 0.1 to 0.2, for best processability and best melt strength, i.e., toughness. Usually, the high load melt index (HLMI) for polymers produced in accordance with this invention are within a range of about 5 to about 50 g/10 min, and preferably within a range of about 10 to about 30 g/10 min. Most preferably, the inventive polymers have a HLMI within a range of 15 to 25, for best processability and melt strength, i.e., toughness. Generally, as HLMI decreases, processing difficulty increases; however, as HLMI decreases, polymer melt strength also decreases, i.e., the polymer is not tough enough to be blown, either blow-molded or blown into film. Therefore, polymers of this invention usually have a HLMI/MI ratio within a range of about 100 to about 300, preferably within a range of about 100 to about 200. Most preferably, the HLMI/MI ratio is within a range of 100 to 175, for the reasons given above.

The inventive polymers also usually have a broad molecular weight distribution, as indicated by the heterogeneity index (HI), i.e., the ratio of weight average molecular weight (Mw) to number average molecular weight (Mn), Mw/Mn. Usually, for polymers of this invention, Mw/Mn is within a range of about 12 to about 35, and preferably within a range of about 15 to about 30. Most preferably, the Mw/Mn ratio is within a range of 18 to 25, for best polymer processability. Generally, for a given MI, as Mw/Mn is broadened, the processability of the polymer improves.

The density of the inventive copolymers ranges from about 0.89 to about 0.915 g/cc, preferably from about 0.895 to about 0.915 g/cc. Most preferably, the copolymer density is within the range of 0.90 to 0.91 g/cc.

As used in this disclosure, a short chain branch (SCB) is defined as a linear, or branched, carbon chain connected to the copolymer backbone, wherein the SCB has from about 1 to about 10 carbon atoms connected to, yet off of, the copolymer backbone. The number of SCBs per 10,000 backbone carbons for copolymers produced according to this invention usually ranges from about 70 to about 200, preferably from about 100 to about 180. Most preferably, the number of SCBs per 10,000 backbone carbon atoms is within the range of about 120 to about 160.

EXAMPLES

Ethylene/higher, alpha-olefin copolymers were prepared in a continuous particle form process by contacting the catalyst system with the monomers, employing a liquid full loop reactor, having a volume of 23 gallons (87 liters), isobutane as the diluent, and occasionally some hydrogen to regulate the molecular weight of the product. The reactor was operated to have a residence time of 1.25 hours. The reactor temperature was varied over a range of 60° to 77° C., to control molecular weight, and the pressure was 4 Mpa (580 psi). At steady state conditions, the isobutane feed rate was 46 l/hr, the ethylene feed rate was about 30 lbs/hr, and the 1-hexene feed rate was varied to control the density of the product polymer. Polymer was removed from the reactor at the rate of 25 lbs/hr.

The tests were conducted according to the following procedures:

Dart Impact (g); ASTM D1709-75. Energy needed to rupture one mil thick film upon impact of a free falling dart. This method establishes the weight of the dart dropped from a height of 26 inches which causes 50 percent of the samples to break. The staircase method is used to determine the 50 percent failure level and the missile weight increment is 15 g. In all instances, the film was 1 mil in thickness, unless otherwise indicated.

Tear Resistance (g/mil); ASTM D1922. This is a modification for polymer film adapted from the Elmendorf tear test used for paper. This method determines the average energy in grams required to propagate a tear through 2.5 inches of film in the machine extrusion direction (MD) or transverse direction (TD) as indicated. In all instances, the film was 1 mil in thickness.

Density (g/cc): ASTM D1505-68 and ASTM D1928, Condition C. Determined on a compression molded sample, cooled at about 15° C. per minute, and conditioned at room temperature for about 40 hours.

High Load Melt Index (HLMI) (g/10 min): ASTM D1238. Determined at 190° C. with a 21,600 gram weight.

Melt Index (MI) (g/10 min): ASTM D1238. Determined at 190° C. with a 2,160 gram weight.

EXAMPLE I

This Example demonstrates the preferred procedure of polymerization according to this invention. A high porosity silica-titania (2.5 cc/g; 600 m$^2$/g; 5 weight percent titanium, based on the total weight of the dried support) containing 1 weight percent chromium, based on the total weight of the dried support, was activated by fluidization in dry air at 650° C. for six hours. The catalyst system was cooled in nitrogen and exposed to 10 volume percent carbon monoxide in nitrogen for another two hours at 350° C., followed by a nitrogen purge and cooling to 25° C. in nitrogen. This catalyst system was used to polymerize ethylene ($C_2$=) and 1-hexene (1-$C_6$=) in the loop reactor described above at 66° C. Isobutane served as the diluent; ethylene was added to maintain 7–9 mole percent of the diluent. Comonomer, 1-hexene, was added to maintain a 1-hexene/ethylene weight ratio of between 0.35 and 0.41, and hydrogen was added to maintain between 0 and 0.5 mole percent of the diluent. Triethyl boron (TEB) was added to maintain about 8.5 mg/kg of the diluent. During polymerization, the reactor contained approximately 60 percent solids by volume.

Using this procedure, a copolymer of 0.910 g/cc density was produced, by having a bulk density within a range of 0.26 to 0.32 g/cc, and a productivity of 900 g polymer per g catalyst system. This polymer material had a melt index (MI) of less than 0.2 g/10 minutes and a high load melt index (HLMI) within a range of 15 to 25 g/10 minutes. Thus, the shear ratio (HLMI/MI) ranged from about 150 to about 170. The copolymer was blown into a 1.0 mil film on the two-inch die at 235° C. at a rate of 40 ft/min., with a 4:1 blow-up ratio and a 14 inch frostline height. Blowing was accomplished quite easily. The film was tested for puncture and tear resistance and found to be extremely tough. The properties were: Dart drop, no breaks at 700 g for 1.0 mil film; Tear resistance, MD greater than 85 g, TD greater than 310 g; Spencer impact, no breaks at 0.83 Joules.

A detailed summary of the results of all Runs is given in Table I.

TABLE I

| VLDPE PRODUCTION USING 1-HEXENE COMONOMER | | | | |
|---|---|---|---|---|
| Parameter | Run 101[b] | Run 102 | Run 103 | Run 104 |
| $C_2$=, mol % in FG[a] | 8.46 | 7.54 | 7.40 | 6.5 |
| 1-$C_6$=, mol % in FG | 2.60 | 2.19 | 2.46 | 1.63 |
| 1-$C_6$=/$C_2$= (mole ratio) | 0.31 | 0.29 | 0.33 | 0.25 |
| 1-$C_6$=, wt % of $C_2$= feed | 34.9 | 38.6 | 41.2 | 5.3 |
| $H_2$, mol % in FG | 0 | 0.51 | 0.52 | 1.3 |
| Jerguson, vol % | 50 | 57.5 | 60 | 55 |
| Productivity, g pol/g cat | 890 | 890 | 870 | 2800 |
| Density (fluff), g/cc | 0.917 | 0.912 | 0.909 | 0.929 |
| HLMI (fluff), g/10 min | 3.1 | 18.1 | 23.8 | 18.7 |
| Density (pellet), g/cc | 0.921 | 0.914 | 0.910 | 0.929 |
| HLMI (pellet), g/10 min | 5.1 | 16.9 | 24.6 | 18.7 |
| MI (pellet), g/10 min | — | 0.10 | 0.16 | 0.21 |
| HLMI/MI (pellet) | — | 169 | 154 | 86 |
| Flexural Modulus, MPa | 372 | 331 | 273 | — |
| Screw, rpm | 30 | 75 | 75 | 75 |
| Melt Temp., °C. | 226 | 237 | 234 | 237 |
| Rate, lb/hr | 15 | 40 | 43 | 42 |
| Dart Impact, g | >700 | >700 | >700 | >700 |
| Spencer Impact, J | 0.83 | 0.86 | 1.00 | 0.52 |
| Tear, MD, g | 120 | 85 | 118 | 124 |

TABLE I-continued

| VLDPE PRODUCTION USING 1-HEXENE COMONOMER | | | | |
|---|---|---|---|---|
| Parameter | Run 101[b] | Run 102 | Run 103 | Run 104 |
| Tear, TD, g | 610 | 530 | 310 | 700 |
| Haze, % | 65 | 36 | 28 | 47 |

[a]FG = flash gas out of reactor
[b]Copolymer product contains 500 mg/kg fluoroelastomer FX-9613, based on the weight of dried polymer. FX-9613 is commercially available from 3M Company.

EXAMPLE II

The procedure described in Example I was repeated, except that 1-butene (1-C$_4$=) was used as the comonomer, instead of 1-hexene. Other conditions were similar to those described in Example I: hydrogen was maintained between 0 and 2.2 mole percent; TEB maintained between 4 and 9.4 mg/kg; productivity ranged between 1000 and 1700 g polymer/g catalyst system; the reactor contained approximately 65 volume solids. The results of the polymerization Runs are shown in Table II.

TABLE II

| VLDPE PRODUCTION USING 1-BUTENE COMONOMER | | | | | | | | | |
|---|---|---|---|---|---|---|---|---|---|
| Parameter | Run 201 | Run 202 | Run 203 | Run 204 | Run 205 | Run 206 | Run 207 | Run 208 | Run 209[b] |
| Catalyst[1] CO reduced | no | no | yes | yes | yes | yes | yes | yes | yes |
| TEB, mg/kg | 8.5 | 8.7 | 4.3 | 8.1 | 4.2 | 8.7 | 5.2 | 5.6 | 4.0 |
| C$_2$=, mol % in FG[a] | 8.90 | 8.34 | 8.42 | 9.48 | 8.53 | 8.14 | 9.00 | 8.31 | 6.5 |
| 1-C$_4$=, mol % in FG | 8.25 | 9.60 | 6.24 | 7.16 | 7.08 | 7.66 | 6.99 | 7.00 | 1.63 |
| 1-C$_4$=/C$_2$= (mole ratio) | 0.93 | 1.15 | 0.74 | 0.76 | 0.83 | 0.94 | 0.78 | 0.84 | 0.25 |
| 1-C$_4$=, wt % of C$_2$= feed | 32.2 | 32.8 | 26.2 | 29.3 | 30.9 | 32.5 | 31.1 | 30.6 | 5.3 |
| H$_2$, mol % in FG[a] | 0.52 | 0 | 2.08 | 0.51 | 2.18 | 0 | 2.16 | 1.94 | 1.3 |
| Jerguson, vol % | 55 | 55 | 65 | 47 | 61 | 52 | 56 | 53 | 55 |
| Productivity, g pol/g cat | 1610 | 1670 | 1240 | 1060 | 1190 | 1220 | 1090 | 940 | 2800 |
| Density (fluff), g/cc | 0.927 | 0.926 | 0.917 | 0.917 | 0.912 | 0.914 | 0.910 | — | — |
| HLMI (fluff), g/10 min | 50.8 | 19.8 | 14.1 | 12.0 | 20.9 | 9.2 | 32.2 | 30.8 | — |
| Density (pellet), g/cc | 0.929 | 0.927 | 0.918 | 0.917 | 0.914 | 0.913 | 0.912 | 0.912 | 0.929 |
| HLMI (pellet), g/10 min | 64.1 | 43.6 | 12.9 | 12.0 | 19.0 | 12.0 | 23.7 | 25.4 | 18.7 |
| MI (pellet), g/10 min | 0.25 | 0.10 | 0.09 | 0.08 | 0.14 | 0.06 | 0.18 | 0.19 | 0.21 |
| HLMI/MI (pellet) | 256 | 436 | 143 | 150 | 136 | 200 | 132 | 134 | 86 |
| Screw, rpm | 75 | 30 | 75 | 30 | 75 | 25 | 30 | 30 | 75 |
| Melt Temp., °C. | 225 | 217 | 240 | 220 | 235 | 220 | 204 | 205 | 238 |
| Rate, lb/1 hr | 38 | 15 | 41 | 17 | 43 | 14 | 17 | 17 | 43 |
| Dart Impact, g | 138 | 153 | >700 | >700 | >700 | >700 | >700 | >700 | >700 |
| Spencer Impact, J | 0.28 | 0.27 | 0.68 | 0.61 | 0.71 | 0.60 | 0.58 | 0.56 | 0.49 |
| Tear, MD, g | 39 | 51 | 51 | 62 | 84 | 87 | 95 | 81 | 115 |
| Tear, TD, g | 650 | 610 | 530 | 560 | 780 | 520 | 620 | 610 | 730 |
| Haze, % | 51 | 63 | 35 | 44 | 25 | 44 | 45 | 63 | 46 |

[a]FG = flash gas out of reactor
[b]Comonomer was 1-C$_6$=, not 1-C$_4$=

While this invention has been described in detail for the purpose of illustration, it is not to be construed as limited thereby, but is intended to cover all changes and modifications within the spirit and scope thereof.

That which is claimed is:

1. A copolymer composition of ethylene and at least one higher alpha-olefin selected from the group consisting of 1-butene, 1-pentene, 1-hexene, 1-octene, 4-methyl-1-pentene and mixtures thereof comprising:
   a) from about 12 to about 40 weight percent higher alpha-olefin, based on the total weight of the copolymer, in said copolymer; and
   b) from about 100 to about 180 short chain branches per 10,000 backbone carbons of said copolymer; and
   wherein said copolymer has a density within a range of about 0.89 to about 0.915 g/cc, a melt index (MI) within a range of about 0.05 to about 0.35 g/10 minutes, a high load melt index (HLMI) within a range of about 5 to about 50 g/10 minutes, a HLMI/MI ratio within a range of about 100 to about 300, and a Mw/Mn ratio within a range of about 12 to about 35.

2. A composition according to claim 1 wherein said higher alpha-olefin is 1-butene.

3. A composition according to claim 1 wherein said higher alpha-olefin is 1-hexene.

4. A composition according to claim 1 wherein said copolymer composition comprises ethylene and at least two higher alpha-olefins selected from the group consisting of 1-butene, 1-pentene, 1-hexene, 1-octene, 4-methyl-1-pentene and mixtures thereof.

5. A composition according to claim 1 wherein said short chain branches have from about 1 to about 10 carbon atoms.

6. A copolymer composition according to claim 1 having a density within a range of 0.90 to 0.91 g/cc, a melt index (MI) within a range of 0.1 to 0.2 g/10 minutes, a high load melt index (HLMI) within a range of 15 to 25 g/10 minutes, a HLMI/MI ratio within a range of 100 to 175, and a Mw/Mn ratio within a range of 18 to 25.

7. A copolymer composition produced according to a slurry polymerization process comprising contacting in a reaction zone under polymerization conditions, at a reaction zone temperature in a range of about 60° to about 77° C.:
   a) a diluent of isobutane;
   b) ethylene monomer;

c) a comonomer of 1-hexene, present in an amount within the range of about 30 to about 60 weight percent, based on the amount of ethylene;

d) triethyl borane, present in an amount within the range of about 2 to about 20 ppm, based on the mass of the diluent; and e) a catalyst system comprising chromium supported on a silica-titania support, wherein said support comprises from about 2 to about 20 weight percent titanium, based on the weight of the support, and wherein said catalyst system has been activated in an oxygen-containing ambient at a temperature within the range of about 300° to about 1000° C. and subsequently reduced in the presence of carbon monoxide at a temperature within the range of about 300° to about 500° C.;

and recovering a polymer.

8. A copolymer composition wherein said polymer has:

a) a density in the range of from about 0.89 to about 0.915 g/cc;

b) a melt index within a range of about 0.05 to about 0.35 g/10 minutes;

c) a high load melt index (HLMI) within a range of about 5 to about 50 g/10 minutes;

d) a HLMI/MI ratio within a range of about 100 to about 300; and e) a Mw/Mn ratio within a range of about 12 to about 35.

wherein said composition is produced according to a slurry polymerization process comprising contacting in a reaction zone under polymerization conditions, at a reaction zone temperature in the range of from about 60° to about 77° C.:

f) a diluent selected from the group consisting of paraffins, cycloparaffins, aromatic hydrocarbons, and mixtures thereof;

g) ethylene monomer;

h) at least one comonomer selected from the group consisting of 1-butene, 1-pentene, 1-hexene, 1-octene, 4-methyl-1-pentene, and mixtures thereof, present in an amount in the range of about 30 to about 60 weight percent, based on the amount of ethylene; and i) a trialkyl boron compound, present in an amount in the range of from about 2 to about 20 ppm, based on the mass of the diluent; and j) a catalyst system comprising chromium supported on a silica-titania support, wherein said support comprises from about 2 to about 20 weight percent titanium, based on the weight of the support, and wherein said catalyst system has been activated in an oxygen-containing ambient and subsequently reduced in the presence of carbon monoxide in an inert ambient.

9. A composition produced according to claim 8 wherein said reaction zone temperature is in the range of from 63° to 68° C.

10. A composition produced according to claim 8 wherein said trialkyl boron compound is triethyl borane and is present in the reaction zone in the range of from about 2 to about 20 ppm, based on the mass of the diluent.

11. A composition according to claim 8 wherein said comonomer is 1-butene.

12. A composition produced according to claim 8 wherein said comonomer is 1-hexene.

13. A composition produced according to claim 8 wherein said catalyst system activation is carried out in air at a temperature in the range of about 300° to about 1000° C. and wherein said carbon monoxide reduction is carried out at a temperature in the range of about 300° to about 500° C.

14. A composition produced according to claim 8 wherein said silica-titania support is formed by coprecipitation.

15. A composition produced according to claim 8 wherein said silica-titania support comprises from about 5 to about 8 weight percent titanium, based on the weight of the support.

16. A composition produced according to claim 8 wherein said catalyst system comprises from about 0.05 to about 5 weight percent chromium, based on the total weight of the catalyst after activation and reduction.

* * * * *